United States Patent

Behrens

[15] 3,679,221
[45] July 25, 1972

[54] CHUCK JAW INSERT AND ASSEMBLY

[72] Inventor: Alvin J. Behrens, 25325 117 Place S.E., Kent, Wash. 98031

[22] Filed: June 11, 1970

[21] Appl. No.: 45,499

[52] U.S. Cl. .............................. 279/1 SJ, 279/110, 279/123
[51] Int. Cl. ........................................................ B23b 31/10
[58] Field of Search ................ 279/155, 123, 110, 115, 1 ME

[56] References Cited

UNITED STATES PATENTS 3,322,434   5/1967   McClung et al. ...................... 279/123
3,190,666   6/1965   Testa ..................................... 279/123

Primary Examiner—Francis S. Husar
Attorney—Clinton L. Mathis

[57] ABSTRACT

A chuck for a turning machine or lathe, is disclosed having three jaws movable radially by a worm and scroll mechanism. The jaws illustrated are in the form of master and top jaws and an insert, formed of relatively soft material, is carried by each top jaw. Each insert is held in place by means disposed along its marginal edge portions. Wedge means are provided by an eccentrically mounted wheel so that a soft jaw insert is held without slack for machining of the surface to engage a work piece. Thus, the soft jaw insert surface is machined, while held in the same position it will be held during use, and prcision machining of soft jaw inserts may be obtained. Also, the use of inserts, selectively in more than one holder carried by a jaw, obtains by the mere cutting of the insert bar stock to desired lengths.

6 Claims, 7 Drawing Figures

PATENTED JUL 25 1972

INVENTOR.
ALVIN J. BEHRENS
BY
Clinton L. Mathis
ATTORNEY

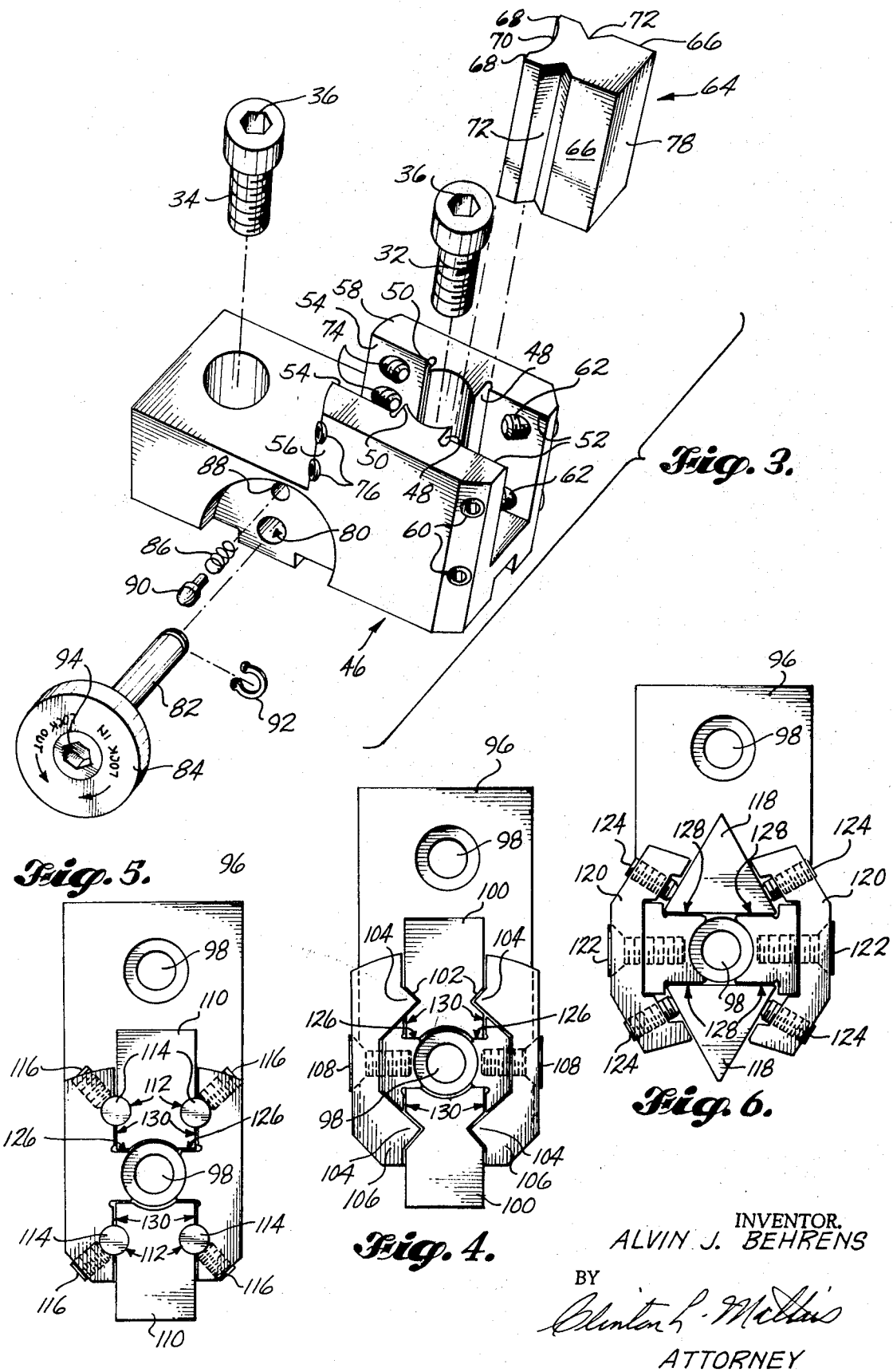

CHUCK JAW INSERT AND ASSEMBLY

My invention relates to a jaw assembly for use in connection with turning machines, such as lathes. More particularly, my invention relates to such mechanism employing soft jaws, to provide a precision fit of the jaw contacting surfaces and the work piece being machined while held in the jaw assembly. The reference to soft jaws and soft inserts herein will refer to a metal or other material which is readily machinable as distinguished from heat treated or hardened metal which is not readily machinable.

Heretofore such soft jaws were generally in the form of single piece jaws, top jaws, or inserts, or combinations thereof. My invention in many aspects is applicable to all four thereof.

Such jaws are mounted for radial movement and are movable together in response to the angular movement of a single member. Thus, for example, the chuck assemblies commonly comprise a worm, a scroll plate turnable by said worm, and jaws connected with the scroll plate through spiral ridges and grooves. After the jaws were moved to substantially the relative, final radial position they would assume during holding of the work piece for turning, the soft jaws or portion, which would finally engage the work piece, were machined or turned with the attempt to cut an arcuate surface on the soft jaws which would match precisely the arcuate surface presented by the work piece to be engaged by the finished surface of the soft jaws.

However, the desired accurate position did not always occur and a reason was that there was slack between the various mechanisms, as the worm, the scroll, and the spiral grooves or ridges, at the time of machining of the soft jaws parts but such slack was not present at the time of use of the jaws when the same were tightened firmly against the work piece.

Another shortcoming of the art was that if soft jaw inserts were used, the means for securing the same to the jaws or top jaws, required holes through the soft jaws and this resulted in a broken or disjointed engaging surfaces in the soft jaws.

Another shortcoming was that if the soft jaw inserts were selectively held adjacent more than one surface of a jaw, an insert of separate configuration was required for each of the inserts to meet or match the particular surface against which the same was held.

It is an object of my invention to overcome the many shortcomings of the prior art including but not limited to those just mentioned.

It is a further object to provide a jaw assembly comprising a jaw having a plurality of mounting surfaces and where each mounting surface has associated side walls and means for mounting said jaw assembly in a chuck so that each mounting surface is substantially parallel to the axis of the chuck.

Another object is to provide associated side walls in connection with the mounting surfaces so that an insert can be held in the chuck of a lathe and by means engaging the insert along its marginal side portions.

A more particular object is to provide a plurality of mounting means on each chuck jaw and each of which mounting means is provided with a mounting surface parallel to the axis of the chuck and associated side walls.

It is a further specific object to provide in combination with said mounting surface and said mounting side walls, spaced apart set screws or socket head screws to hold an insert in mounting means carried by jaws of a chuck.

It is a further specific object to provide set screws to engage opposite side walls of a jaw insert.

It is a further object to provide a groove extending lengthwise of an insert and to engage said groove by socket head screws, clamps or a combination thereof.

It is a further object to provide relatively soft jaws for the chuck of a lathe and which soft jaws are to be held substantially rigid and without any slack at the time they are machined to fit the work and hence, to permit machining the said soft jaws under substantially the same conditions under which they will be operating at the time they are holding a work piece in the chuck assembly.

A more particular object is to provide by combination of jaws and inserts and in combination where a master jaw and top jaws are used and where the insert is cut away so that there is no interference between the bolts holding a top jaw and a master jaw together and such bolts can be removed at any time and this regardless of whether or not an insert is present in the jaw.

Other objects of my invention will become explicit as well as implicit as the description of my invention proceeds in connection with the following drawings, wherein like reference numerals indicate like parts and wherein:

FIG. 3 is an exploded perspective view of a chuck jaw embodying my invention;

FIGS. 4, 5 and 6 are end views of modified forms of my invention; and

Figure 1:
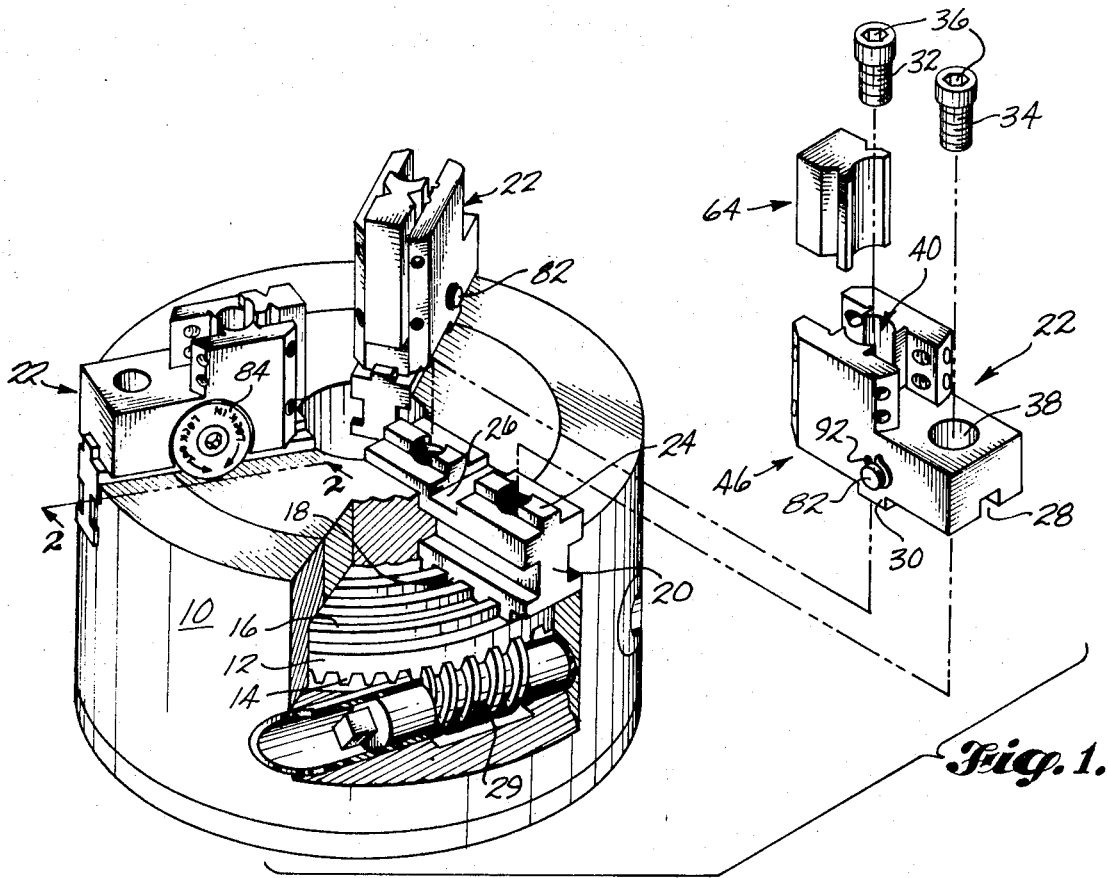
FIG. 1 is an exploded, perspective view, with parts broken away, of a chuck of a lathe with my invention shown in association therewith.

To illustrate my invention, I have shown in FIG. 1 of the drawings a chuck body 10 supporting a scroll plate 12 which is mounted for angular movement, which movement is accurately controlled in either direction by worm 29 meshing with ring gear 14 disposed on the under side of scroll plate 12. On the upper surface of scroll plate 12 are located spiral ridges 16. Between the ridges 16 are grooves into which ridges 18 of master jaws 20 project. In the form of the invention illustrated, I have shown master jaws 20 supporting top jaws 22 but it is to be expressly understood that my invention is not limited to top jaws unless the express wording of the claims positively requires and that my invention is to be construed to cover jaws whether the same are in a single piece or whether the jaws are formed from master jaws and top jaws. In FIG. 1 also I have illustrated three master jaws 20 and three associated top jaws 22. In this connection the same is illustrative, as jaws used in connection with lathes often have more than three jaws and sometimes have two jaws.

Now referring to the master jaws 20, each has conventional means so a top jaw may be secured thereto, as a tongue 24, which extends radially of the chuck body, and a cross groove 26 mating grooves and tongues carried by each associated top jaw. Also, the scroll plate 12 is turned in one direction or the other in an adjusted amount by turning of worm 29 meshing with the ring gear 14, disposed on the under surface of the scroll plate 12.

Each of the top jaws 22 is provided with a radially extending groove 28 which mates with the radially extending tongue 24 of a master jaw 20 and also each of said top jaws 22 is provided with a transversely disposed tongue 30 which mates with a cross groove 26 carried by a master jaw 20. A top jaw 22 is further secured to each master jaw 20 by threaded stud bolts 32 and 34, each of which is commonly provided with a hexagonal opening 36 designed to receive therein an "Allen" wrench or tool.

Thus, I have described a conventional lathe chuck as an embodiment in which my invention may be used but it is to be understood that such conventional embodiment is only illustrative and is not a limitation. My invention relates to structure which is embodied in or carried by a top jaw or the top portion of a single jaw used in the place of a master jaw and a top jaw.

Each master jaw 20 is held against displacement in the chuck body by reason of its cross-sectional configuration and matching recesses in the chuck body in accordance with conventional practice. Also, the radial position of each master jaw 20 is determined by scroll plate 12 and worm 29, as previously described. Each of the top jaws 22 is provided with apertures 38 and 40 and the apertures 38 and 40 are provided with seats 42 and 44 (FIG. 2) against which the heads of the stud bolts 32 and 34 rest when the said stud bolts are tightened against threaded portions in the master jaws 20. By the use of tongues and grooves as well as stud bolts, each top jaw 22 is held firmly against its associated master jaw 20 and with no movement between the said jaws.

Each top jaw 22 has an insert support end portion 46 with is rather massive as compared with the opposite end portion of the top jaw and such portion 46 extends substantially in a direction axially of the chuck body 10. In each of said insert support portions 46 are provided mounting surfaces 48 and 50 (FIG. 3) and said mounting surfaces 48 and 50, each comprises two spaced apart and parallel segments. Associated with each of the mounting surfaces 48 and 50 are, respectively, two side wall surfaces 52 and two side wall surfaces 54. In the form of the invention shown in FIGS. 1-3, inclusive, the side wall surfaces 52, 52 are parallel to each other and at right angles to the mounting surface 48 and similarly, the side wall surfaces 54,54 are parallel to each other and at right angles to the mounting surface 50.

Figure 2:
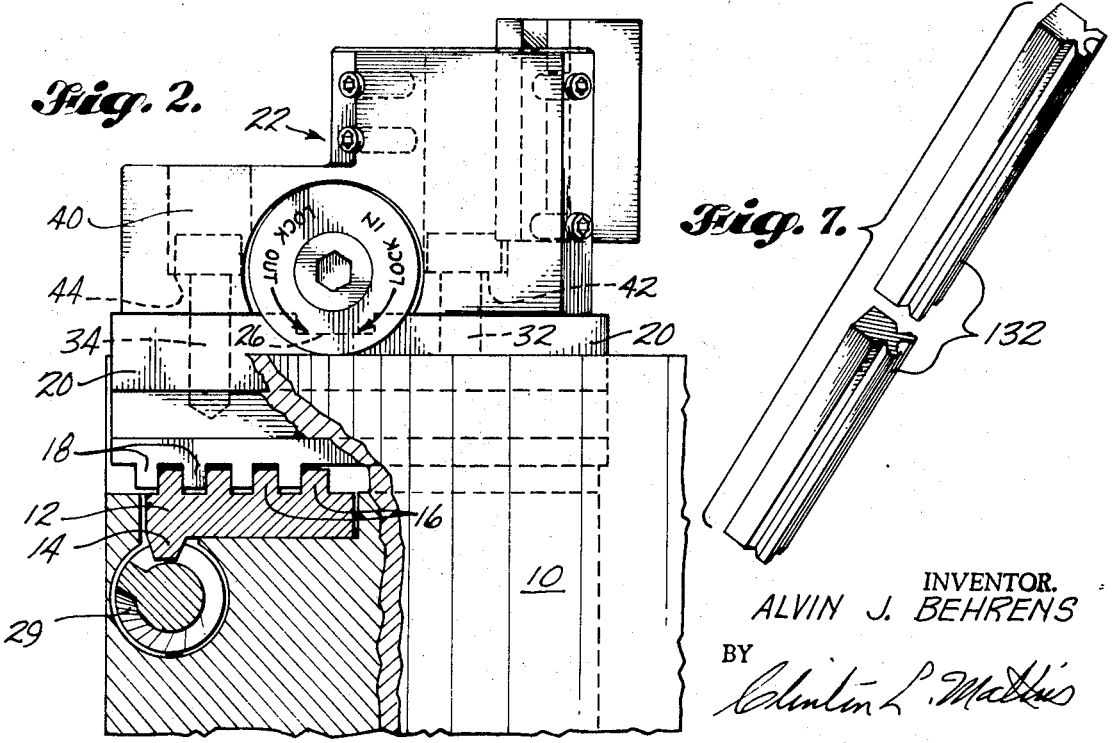
FIG. 2 is a view partially in section and partially in elevation and taken substantially on broken line 2—2 of FIG. 1.

In the form of insert 64 shown in FIGS. 1-3 of the drawings, the same is a solid which is rectangular in cross section and in longitudinal section, and is generally in the form of a right parallelopiped. The insert support end portion 46 of a top jaw 22 is provided with two side walls 56 and 58 and the said side wall surfaces 52 and 54 are inside surfaces of said side walls 56 and 58. Socket head set screws 60 and 62 are carried by threaded openings in the side walls 56 and 58, and as shown, said socket head set screws 60 and 62 are provided with hexagonal openings for the reception therein of an "Allen" wrench or tool. To secure an insert 64 in place, it is positioned with its side walls 66 against the side wall surfaces 52,52 or 54,54 of the side walls 56 and 58 of top jaw 22. The bottom wall of the insert 64 is formed by two spaced apart surfaces 68, which are separated by arcuate surface 70, and next the said spaced apart surfaces 68 are disposed against the mounting surface 48 or 50 of the insert support portion 46.

The insert 64 is provided with longitudinally extending grooves 72 disposed on opposite sides of the insert 64. After the socket head set screws 60 and 62 are turned so as to be noninterferring and the insert 64 has been inserted with its side walls 66 adjacent the side wall surface 52 or 54 and so that its spaced apart surfaces 68 engage a mounting surface 48 or 50, then the socket head set screws 60 and 62 are tightened to hold the insert 64 rigidly in place and to hold the insert by securing means carried by the side walls 56 and 58 of a holder or the insert support end portion 46. Also, the securing means, as the socket head set screws 60 and 62, engage the jaw insert 64 at a plurality of locations spaced from each other and spaced in the direction of the axis of the chuck body 10.

In view of the arcuate portion 70, a stud bolt 32 can be inserted or removed at any time without the need of first removing an insert 64 and likewise, an insert 64 can be inserted or removed without in any wise interferring with the relative position of a stud bolt 32.

Sometimes it is desired to hold an insert, as insert 64, further away from the axial center of the chuck body 10 and when desired, the insert 64 may be held between side wall surfaces 54 with the side walls 66 of an insert 64 abutting the same and with the spaced apart surfaces 68 of the insert 64 adjacent the mounting surfaces 50 of the insert support portion 46. This can be readily done and, if desired, additional socket head set screws 74 and 76 may be provided engaging an insert 64 at the area of the longitudinal groove 72.

When the parts are in the relative positions shown in FIGS. 1 to 3 of the drawings, the insert 64 has its side walls 66 and spaced surfaces 68 positioned adjacent, respectively, the side wall surfaces 52 and mounting surfaces 48 of the insert support portion 46. In such position, the surface 78 of insert 64 may be urged against to support the outside diameter of a work piece to be held in the jaws of the chuck or the surfaces 68 could be held against the internal diameter of a ringlike structure to be supported by the jaws of the chuck. Of course, where the surfaces 68 are used to support the internal surface of a ringlike object, then the insert 64 will have to be sufficiently long so that there will be substantial extension of the insert 64 beyond the sidewise dimension of the insert support portion 46 of jaw 22. When the insert 64 has its side walls 66 and its spaced apart support surfaces 68 contacting, respectively, with the side wall surfaces 54 and mounting surfaces 50 of the insert support end portion 46, then the surface 78 of the insert 64 will engage the internal surface of a ringlike object to be supported by the chuck jaws or the surfaces 68 of the insert 64 will engage the external diameter of a work piece to be supported by the jaws of the chuck body 10.

Also, the top jaws 22 may be reversed in their positions relative to the master jaws 20, so that the insert support end portion 46, instead of being in the position shown in FIGS. 1 to 3 of the drawings where the same is axially inwardly or the said top jaw may be reversed so that said insert support portion 46 is axially outward. Such capacity to change position permits the chuck to engage work pieces of greater variance in size dimensions over using the top jaw in only one position. A reversible top jaw has a very definite place in the chucking art.

Each top jaw 22 is provided with a transverse bore 80 to rotatively mount therein a shaft 82 on which is eccentrically mounted a wheel 84. A compression spring 86 is mounted in a recess 88 in the body of each top jaw 22 and spring loads the detent pin 90 to provide frictional resistance against the wheel 84 when the parts are assembled. In the assembly of the parts, the shaft 82 is inserted into the transverse bore 80 and urges the spring 86 into the recess 88 and thus spring loading the detent pin 90 against the internal surface of the wheel 84. In order to hold the said shaft in place, keeper 92 is inserted in and appropriately positioned groove in the periphery of the shaft 82. In order to turn the wheel 84 when desired, a hexagonal opening 94 is provided in the end portion thereof to receive an "Allen" wrench or tool. The adjacent side wall of each top jaw 22 is cut away, preferably, so that the wheel 84 does not project unsightly from the sides of a top jaw 22. However, the distance between the inside of the wheel 84 and the center line of a top jaw 22 must be such that the wheel 84 will overlie the sides of the master jaw 20 as is best shown in FIG. 1 of the drawings. It is desired that the wheel 84 shall not in any wise engage the master jaw 20 and also that the top jaw 22 be reversible as previously indicated so that wheel 84 can project out from one side, or the other side, and will overlie without contacting the associated master jaw 20. It is desired that the peripheral surface of the wheel 84 be arranged so that the same can be rotated and thus brought into wedging contact with the adjacent surface of the chuck body 10, which is shown uppermost in FIG. 1 of the drawings.

In FIGS. 2 and 3, the wheel 84 bears opposite notations of "LOCK IN" and "LOCK OUT". Such notations are helpful but read accurately only when the parts are in the positions shown in the drawings. If a top jaw 22 is reversed in position, the notations will read opposite to the facts.

The inserts 64 form so-called "soft" jaws to be machined to precisely fit a work piece to be held by the chuck assembly. As shown in FIGS. 1 to 3, the surface 78 or the surface provided by the spaced apart surfaces 68 obviously will not precisely fit many articles and, of course, are not tailored to fit a particular object or work piece. Thus, in order to obtain the desired precision and to obtain the maximum benefit from the "soft" jaws provided by the inserts 64, it is necessary to machine either the surfaces 78 or the surfaces 68 to precisely the desired contour. Thus, cutters or other machining tools are employed after the jaws are set up and then the jaws, including the top jaws 22 are moved relatively inwardly or outwardly to provide an exact diameter to fit the said work piece. There is always a question of some slack where we have worms and ring gears and matters of that sort which are angularly moved. Thus, when the worm 29 is turned in the desired direction and in turn the scroll plate 92 is turned and in turn the master jaws, there will be a certain amount of slack in view of the fact that there will not be a work piece held between the various inserts 64 at the time that the desired surfaces thereof are turned to the desired diameter. Thus, we have one condition at the time of turning the said inserts to size and another condition at the time the said inserts are operative or are being used to hold a work piece in the chuck assembly.

In order to provide conditions where the said inserts 64 have faces thereof turned and the conditions are identically the same as when the said inserts are being used to grip a work piece, I provide the said wheel 84 and the mode of operation involved will next be set forth. Due to the fact that each said wheel 84 is eccentrically mounted on the shaft 82, the said wheel 84 can be turned and its periphery directed adjacent and into sliding contact, but not wedging contact, with the upper surface of the chuck body 10. At this time, the jaws and inserts 64 are moved radially either inwardly or outwardly until the almost exact position is obtained for turning or machining the said desired surfaces on the inserts 64. Then an "Allen" wrench is employed in connection with the openings 94 and each wheel 84 is turned in the direction to lock the peripheries of wheels 84 with the upper surface of chuck body 10. Thereafter, the worm 29 is turned in a given direction to cause the peripheral surface of the wheel 84 to rotate and increase pressure against the upper surface of the chuck body 10 and with sufficient wedging action so that the worm 29 can be no longer turned in the given direction which it was being turned. Turning the worm 29 in the opposite direction, of course, will tend to unlock or lock out the wedging action obtaining from the wheel 84. Thus, because of the eccentrically mounted wheels 84, a definite wedge is provided between the top jaw 22 and the upper surface of the chuck body 10. After all slack has been removed, the various inserts 64 can have the appropriate surfaces thereof machined or otherwise turned to the exact size and under conditions similar to those under which the inserts will be later used. When they are later used, of course, they will be snugly contacting and firmly adjacent the work piece and they will thus be used under substantially the same conditions as which they were originally machined so that there is this surety that the said pieces can be machined to precision and to a positive fit.

Also, where a plurality of identical pieces are to be machined or held in the chuck assembly, the jaws which have been positively fitted precisely to fit one of the series to be separately machined, there will be a repeat of holding each of the work pieces in the identical way and with precision of fit. To release a wheel 84 after it has been used to wedge between a jaw, such as a top jaw 22, and a chuck assembly, such as the chuck body 10, it is only necessary to turn the worm 29 in the direction opposite to that which it was turned to provide the wedge, and then the wheel 84 can be turned very readily by the use of an "Allen" wrench in the hexagonal opening 94.

Each insert 64 of FIGS. 1 to 3 was held in place or secured to a chuck jaw, such as a top jaw 22, by reason of securing means carried by the side wall of the holder holding the insert 64 and more particularly by reason of mounting surfaces 48 or 50 which are parallel to the axis of the chuck assembly and the associated side walls 52 or 54, respectively. An insert 64 was urged against the mounting surfaces 48 and 50 by the socket head set screws 60 or 62. As an alternative for such construction, I have shown in FIG. 4 of the drawings a chuck jaw 96 having assembly mounting holes 98 and inserts 100, which inserts 100 may be duplicates of the inserts 64 of the previous figures. Instead of using socket head set screws engaging a wall of a longitudinal groove as the longitudinal groove 72 of the previous figures, the longitudinal groove 102 of FIG. 4 is engageable by a mating projection 104 carried by clamp means 106, illustrated in FIG. 4 by two clamps 106, each having two projections 104. A single clamp and a single projection may be employed to hold an insert 100 in place instead of the multiple arrangement illustrated in FIG. 4 of the drawings. Also, each clamp means 106 is held in place and provides the desired pressure against the inserts 100 by reason of threaded screws 108.

In FIG. 5 of the drawings I have illustrated a still further modification wherein the inserts 110 have been modified so that instead of longitudinally extending grooves 102 of FIG. 4, the same comprise grooves 112 extending in the same direction as the grooves 102 but which are in the form of a portion of an arc in section. Interfitting said grooves 112 are longitudinally extending pins or rods 114 and each of said pins or rods 114 is adjustably held in place by socket head screws 116.

In FIG. 4 of the drawings, the structure for holding the inserts in place comprises brackets which held inserts along their marginal side portions and in FIG. 6, there is a combination of the structure of FIG. 4 and the structure of FIGS. 1 to 3, inclusive, in that there is shown the use of brackets and also the use of socket head screw means. Thus, in FIG. 6, the inserts 118 are held in place by brackets 120, which are detachably secured to and held in place against a chuck jaw 96 by screws 122, and each of the brackets 120 is provided with socket head set screws 124 and due to the shape of the inserts 118, which are triangular in section, there is no need of longitudinally extending grooves and the said socket head screws 124 may engage directly the said inserts 118. Also, in connection with FIGS. 4, 5 and 6 of the drawings, and in order to condense and abbreviate the description, the said figures show a chuck jaw 96 and assembly mounting holes 98 which are incorporated from previous description, by way of illustration and without additional description.

From the foregoing it now will be obvious that I have provided a jaw assembly which may include a top jaw 22 or the top portion of a single piece jaw assembly used in connection with a conventional chuck jaw assembly which may comprise two or more jaws. Such jaw assembly comprises a jaw-mounting surface such as the jaw-mounting surfaces 48 or 50 of FIGS. 1 to 3 or the mounting surfaces 126 of FIGS. 4 and 5, or the mounting surfaces 128 of FIG. 6. In connection with said mounting surfaces, there are provided associated side wall surfaces such as 52 and 54 of FIGS. 1 to 3; 130 of FIGS. 4 and 5; and in FIG. 6 the side walls are provided by surfaces of the brackets 120. Means are provided for mounting the jaws on a chuck so that the mounting surfaces 48 and 50, 126, and 128 extend in planes substantially parallel to the axis of the chuck assembly or chuck body 10. Next, I have provided a jaw insert such as the insert 64 of FIGS. 1 to 3; the insert 100 of FIG. 4; the insert 110 of FIG. 5; or the insert 118 of FIG. 6. The jaw inserts have base and side walls abutting, respectively, the mounting surfaces appropriate to that insert and the associated side walls of the jaw involved. Next, in each case the attaching means for detachably securing the jaw insert to the jaw comprises securing means carried by the side walls of the holder and which detaching means engage the jaw insert at a plurality of locations spaced from each other along the inserts and in the direction of the axis of the chuck.

Figure 7:
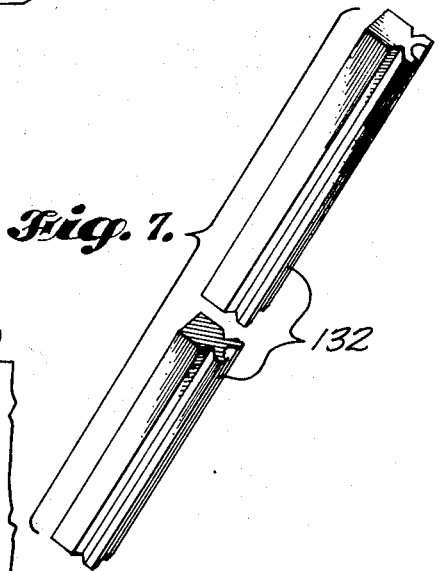
FIG. 7 is a perspective view of an insert blank embodied in my invention.

In connection with FIGS. 1 to 3 of the drawings, when the insert 64 is held in a jaw, such as the top jaw 22, and the said top jaw is in the position shown in FIGS. 1 to 3 of the drawings so that the insert will engage the inner surface of a ringlike work piece, then it is desirable that the inserts extend beyond the body portion of the top jaw 22 to provide sufficient surface area to contact the work piece. Thus, it is desirable to have inserts which can be provided and which will have the desired length. Also, in addition it is desirable to manufacture inserts at a minimum cost and to have insert stock readily available to be tailored to fit inserts as needed. Thus, I have shown in FIG. 7 of the drawings an elongated piece of stock 132 which has been either milled to size and dimension or which has been extruded to dimension so that the only dimension not provided is the length. Thus, the said stock 132 can be cut at desired lengths and the stock furnished very cheaply as extrusions are not an expensive item and obviously, extrusions can be readily made for soft jaws. In other words, if the jaws are aluminum, nylon, soft steel, brass, phenolic, and many other materials, they can be readily extruded and, if necessary, the insert product can be machined to provide the desired cross-sectional area with the length indeterminate at the time of manufacture but to be determined by the user. While the construction of the insert stock material 132 of FIG. 7 shows stock for use in making the inserts of FIGS. 1 to 3, yet the same principle is readily applicable to providing bar stock for the inserts 100 of FIG. 4, 110 of FIG. 5, 118 of FIG. 6, or the inserts of other cross-sectional configurations that may be used.

Another feature of the present invention, which will be readily apparent in view of the foregoing, is the fact that the same insert can be used either to support a work piece whether the same is engaged on its outer surface or inner surface or, in other words, as for example in connection with FIG. 1, the insert may be inserted in the support provided by the surfaces 48 and 52 or by the surfaces provided by 50 and 54 and the same insert used, or at least an insert made from the same bar stock may be used, although they may vary in length. Thus, the same insert may be selectively mounted in a first or a second mounting surface of a jaw assembly. Also, the jaws of chucks of different sizes, such as a 6 inch chuck or a 12 inch chuck, can have provided in the top jaws thereof or in the top portions of single piece jaws thereof, recesses and mounting surfaces thereof corresponding to mounting surfaces 48, 48 and two side walls 52 so that the inserts for each can all be made from a common piece of bar stock, as stock 132 of FIG. 7. Also, as inserts of my invention are symmetrical in section, they may be turned end for end, when desired, and their utility increased. Thus, because of the construction of my mounting surfaces and inserts, the same inserts or inserts from the same stock can be used not only in first and second mounting surfaces in the same jaw assembly but in jaw assemblies of substantial variation in size. Heretofore it was common practice for machine shops to stock numerous sizes of "soft" jaws to fit chucks of different sizes, a shortcoming overcome by my invention.

Also, by use of an eccentrically mounted wheel 84 in combination with a chuck base, jaws that are movably mounted on the chuck base for radial movement toward and away from the work piece, and a detachable insert carried by the jaws, I can provide a wedging action so that the chuck jaws can be held in the position where they are finally used and this at the time of machining of the "soft" jaws or insert to positively fit the work piece to be later turned. This elimination of slack at the time of the machining of the "soft" jaws provides for the ultimate in precision in machining where "soft" jaws are to be employed.

It will also appear from the foregoing that in connection with the use of master jaws and top jaws and the inherent use of stud bolts to secure the same together, that inserts such as inserts 64 may be provided with an arcuate surface 70 and thus the bore opening through which a stud bolt 32 is inserted will be free of obstructions and at the same time the inserts 64 may have maximum support with minimum interference with the insertion or removal of stud bolts, such as stud bolts 32.

Obviously, changes may be made in the forms, dimensions, and arrangements of the parts of my invention without departing from the principle thereof, the foregoing setting forth only preferred forms of embodiment of my invention.

I claim:

1. A jaw assembly comprising a jaw having a mounting surface and associated side walls; means for mounting said jaw on a chuck so that said mounting surface is parallel to the axis of the chuck; a jaw insert having its base and side walls abutting, respectively, said mounting surface and said associated side walls of said jaw; and attaching means for detachably securing said jaw insert to said jaw comprising spaced apart set screws threadedly carried by said side walls of said jaw and engaging said jaw insert at a plurality of locations spaced from each other in the direction of the axis of the chuck, and are movable into and out of engagement with the side walls of the jaw insert, said jaw insert having a groove extending longitudinally of said jaw insert and in a direction parallel to the axis of the chuck and said set screws are movable into and out of engagement with the side wall of the jaw insert forming said groove.

2. The combination of claim 1 wherein first and second mounting surfaces with associated side walls are provided, said mounting surfaces are parallel to each other and parallel to the axis of the chuck, and the same insert may be selectively mounted in either the first mounting surface and its associated side walls or the second mounting surface and its associated side walls.

3. The combination of claim 1 wherein said groove in said jaw insert is formed by two walls intersecting at substantially 90° and said walls intersect the side walls of the jaw insert at substantially 135°; and the set screws are threadedly supported by the side walls of the holder and at an angle of substantially 45° thereto and alined to engage a wall of said groove at substantially 90°.

4. A lathe chuck comprising, a chuck base; jaws movably mounted on said base for axial movement toward and away from the work piece to be held in said chuck; a relatively soft, detachable insert carried by each of said jaws; and wedging means carried by each of said chuck jaws and with a surface portion thereof movable into and out of engagement with said chuck base, whereby slack between said base and said jaws may be eliminated and said insert may be cut while held in said jaw and in the absence of slack in the mounting thereof indirectly on said base.

5. The combination of claim 4, wherein said wedging means comprises a wheel eccentrically carried by each of said chuck jaws and where the perimeter of said wheel is movable into and out of engagement with the chuck base.

6. The combination of claim 4, wherein a scroll movably mounts said jaws on said chuck base.

* * * * *